(12) United States Patent
Hoff et al.

(10) Patent No.: US 11,208,994 B2
(45) Date of Patent: Dec. 28, 2021

(54) AIR COMPRESSOR SYSTEM CONTROL

(71) Applicant: Caterpillar Inc., Deerfield, IL (US)

(72) Inventors: Brian D. Hoff, Washington, IL (US);
Daniel S. Hahn, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 134 days.

(21) Appl. No.: 16/277,211

(22) Filed: Feb. 15, 2019

(65) Prior Publication Data
US 2020/0263681 A1 Aug. 20, 2020

(51) Int. Cl.
| | | |
|---|---|---|
| *F04B 49/035* | (2006.01) | |
| *F04B 49/06* | (2006.01) | |
| *F04B 17/06* | (2006.01) | |
| *F04B 49/10* | (2006.01) | |
| *F04B 49/08* | (2006.01) | |
| *B60T 17/02* | (2006.01) | |
| *B60C 23/14* | (2006.01) | |
| *F04B 39/16* | (2006.01) | |
| *F04B 41/02* | (2006.01) | |

(Continued)

(52) U.S. Cl.
CPC ............ *F04B 49/035* (2013.01); *F04B 17/06* (2013.01); *F04B 49/065* (2013.01); *F04B 49/08* (2013.01); *F04B 49/10* (2013.01); *B60C 23/00* (2013.01); *B60C 23/14* (2013.01); *B60T 17/02* (2013.01); *F02B 37/04* (2013.01); *F04B 39/16* (2013.01); *F04B 41/02* (2013.01); *F04B 2205/11* (2013.01); *F04B 2205/16* (2013.01)

(58) Field of Classification Search
CPC ........ F04B 49/035; F04B 49/08; F04B 49/10; F04B 49/065; F04B 49/03; F04B 17/06; F04B 39/16; F04B 41/02; F04B 2205/16; F04B 2205/11; F04B 2205/05; F04B 35/002; B60C 23/14; B60C 23/00; B60T 17/02; B60T 17/002; B60T 17/004; F02M 26/08; F02M 26/09; F02M 26/10
See application file for complete search history.

(56) References Cited

U.S. PATENT DOCUMENTS

| | | | |
|---|---|---|---|
| 4,689,960 A * | 9/1987 | Schroder | F04D 27/0238 60/607 |
| 4,819,123 A * | 4/1989 | Hatimaki | H02H 7/0816 361/23 |
| 5,592,754 A | 1/1997 | Krieder et al. | |

(Continued)

FOREIGN PATENT DOCUMENTS

| | | | | |
|---|---|---|---|---|
| DE | 10347072 | 5/2005 | | |
| WO | WO-2007060274 A1 * | 5/2007 | | F02B 29/00 |

*Primary Examiner* — Nathan C Zollinger
(74) *Attorney, Agent, or Firm* — Schwegman, Lundberg & Woessner

(57) ABSTRACT

An air system and method includes an air compressor, a temperature sensors, a valve, and a controller. The air compressor is configured to receive filtered air. The temperature sensor is positioned at or near an outlet of the air compressor and configured to sense a temperature at or near the outlet of the air compressor. The valve is operatively connected to an outlet of the air compressor and external to the air compressor. The controller is configured to monitor the sensed temperature at the outlet of the air compressor and control the valve to permit air to flow from the outlet of the air compressor through the valve to unload the air compressor if the sensed temperature exceeds a threshold temperature.

16 Claims, 4 Drawing Sheets

(51) Int. Cl.
*F02B 37/04* (2006.01)
*B60C 23/00* (2006.01)

(56) References Cited

U.S. PATENT DOCUMENTS

| | | | | |
|---|---|---|---|---|
| 5,674,332 | A | * | 10/1997 | Battocchio ............ B60C 23/003 |
| | | | | 152/416 |
| 6,036,449 | A | | 3/2000 | Nishar et al. |
| 6,123,510 | A | * | 9/2000 | Greer .................... F04B 49/065 |
| | | | | 417/295 |
| 6,244,824 | B1 | | 6/2001 | Centers et al. |
| 6,257,838 | B1 | * | 7/2001 | Schlossarczyk ........ F04B 39/08 |
| | | | | 417/275 |
| 6,379,122 | B1 | | 4/2002 | Little |
| 7,632,076 | B2 | * | 12/2009 | Seitz ........................ B60T 17/02 |
| | | | | 417/1 |
| 10,060,427 | B2 | * | 8/2018 | Siuchta ................... B60T 17/02 |
| 2006/0127224 | A1 | * | 6/2006 | Sweet .................... F04B 49/065 |
| | | | | 417/32 |
| 2008/0292471 | A1 | | 11/2008 | Sweet et al. |
| 2014/0369853 | A1 | * | 12/2014 | Siuchta ................... F04B 49/03 |
| | | | | 417/26 |

\* cited by examiner

AIR COMPRESSOR SYSTEM CONTROL

TECHNICAL FIELD

The present application relates generally to air systems. More particularly, the present application relates to control of air compression systems.

BACKGROUND

Air compressors can be used in vehicles to provide compressed air for air-powered vehicle systems. In many applications, during operation, the air compressor runs well below its rated pressure and at a low duty cycle. However, in some applications, the compressor may be run at or close to its maximum rated pressure, with extreme duty cycles, and in high temperatures. It is desirable, in these conditions, to ensure continued operation of the compressor.

U.S. Patent Application Publication No. 2008/0292471 A1, to Bendix Commercial Vehicle Systems LLC, discloses an air compressor that includes an internal unloader assembly and a governor to control unloading the air compressor. The internal unloader assembly allows air to circulate within a head of the compressor to unload the compressor.

SUMMARY OF THE INVENTION

In one example, an air system includes an air compressor, a temperature sensors, a valve, and a controller. The air compressor is configured to receive filtered air. The temperature sensor is at or near an outlet of the air compressor and configured to sense a temperature at or near the outlet of the air compressor. The valve is operatively connected to an outlet of the air compressor and external to the air compressor. The controller is configured to monitor the sensed temperature at the outlet of the air compressor and control the valve to permit air to flow from the outlet of the air compressor through the valve to unload the air compressor if the sensed temperature exceeds a threshold temperature.

In another example, a method of controlling an air system includes sensing, by a temperature sensor positioned at or near an outlet of an air compressor, a sensed temperature; comparing, by a controller, the sensed temperature to a threshold temperature; and controlling, by the controller, a valve operatively connected to the outlet of the air compressor to permit air flow from the outlet of the air compressor through the valve if the sensed temperature exceeds the threshold, wherein the valve is positioned external to the air compressor.

In another example, a power pack connectable to a vehicle air system includes a filtered air supply, an air compressor, a temperature sensor, a pressure sensor, a valve, and a controller. The temperature sensor is positioned to sense a temperature at or near an outlet of the air compressor. The pressure sensor is positioned to sense a pressure downstream of the outlet of the air compressor. The valve is operatively connected to the outlet of the air compressor and positioned external to the air compressor. The controller is configured to open the valve upon the pressure exceeding a cut-out threshold or the temperature exceeding a temperature threshold to permit air to flow through the valve.

DETAILED DESCRIPTION

Figure 1:
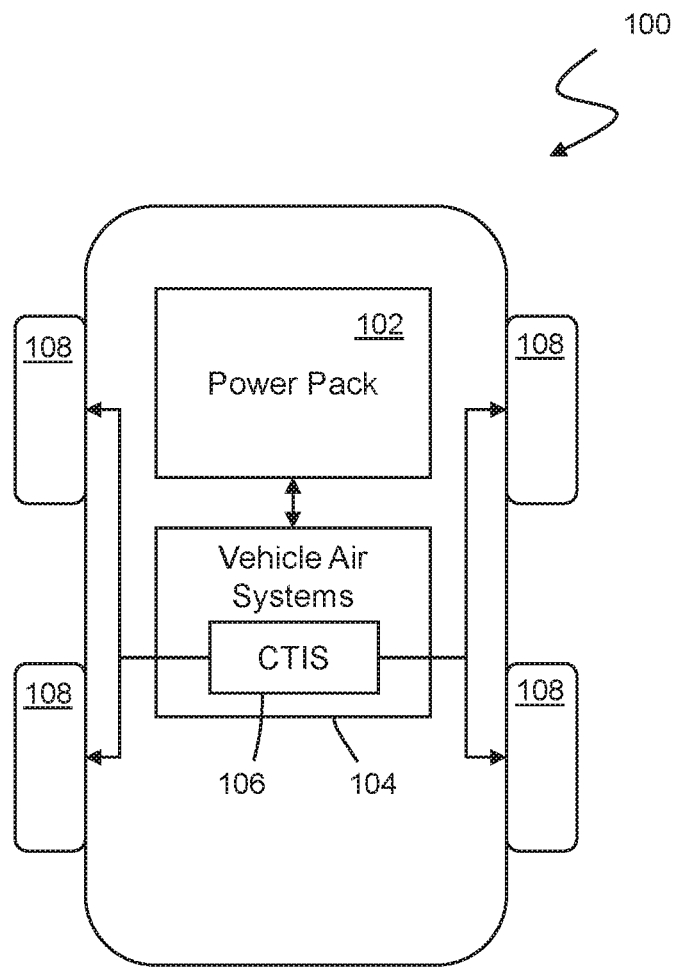
FIG. 1 is a diagram illustrating a vehicle that includes a power pack having a compressor to provide air for vehicle air systems.

FIG. 1 is a diagram illustrating a vehicle 100 that includes a power pack 102 having an air compressor for providing compressed air to vehicle air systems 104. The vehicle air systems 104 can include air brake systems, or any other systems for the vehicle 100 that utilize compressed air. The vehicle air systems 104 can also include a central tire inflation system (CTIS) 106 for providing air to inflate the tires 108 of the vehicle 100. The vehicle 100 can be a truck or any other vehicle that includes systems that utilize compressed air from an engine driven air compressor, for example.

Figure 2A:
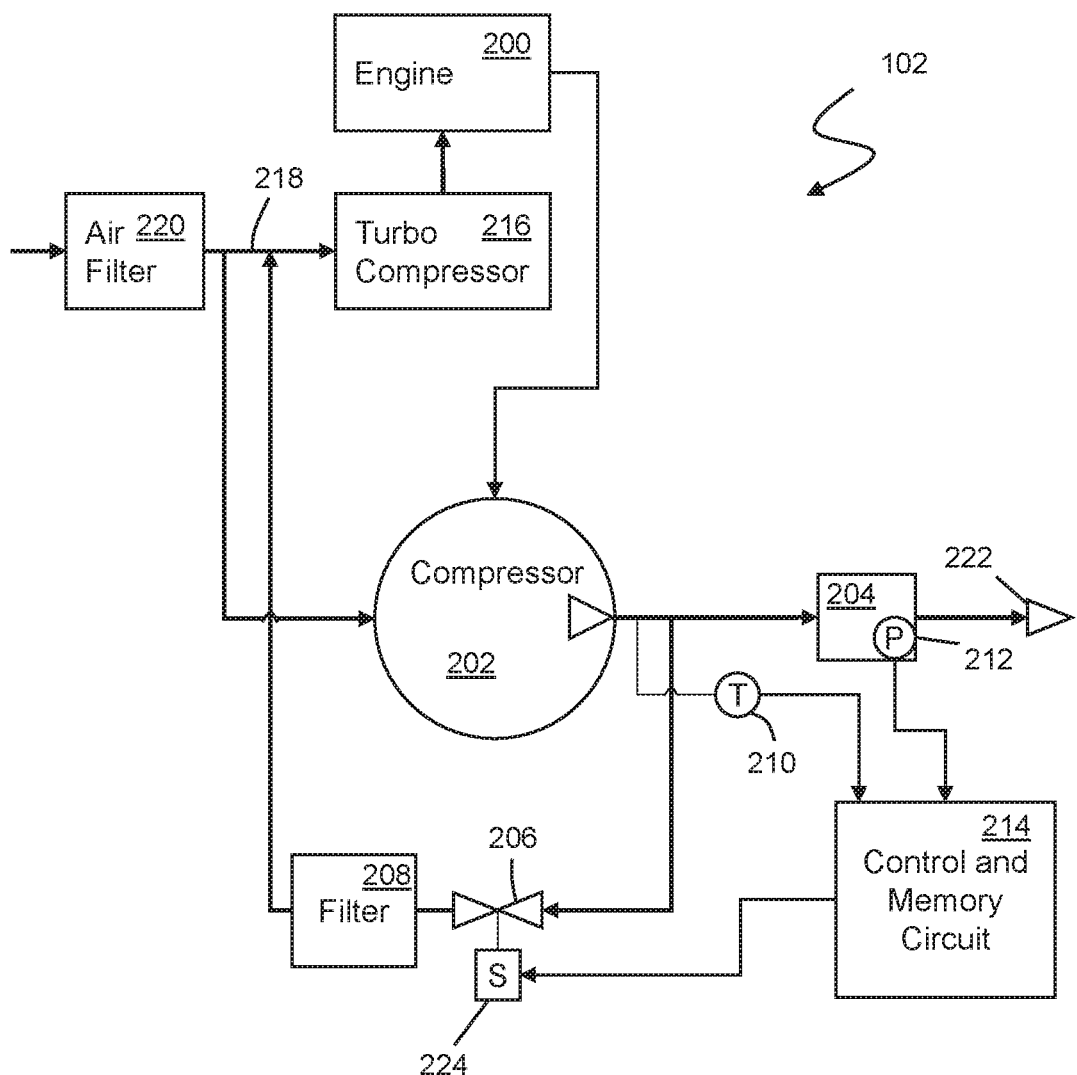
FIG. 2A is a block diagram illustrating an example vehicle power pack.
Figure 2B:
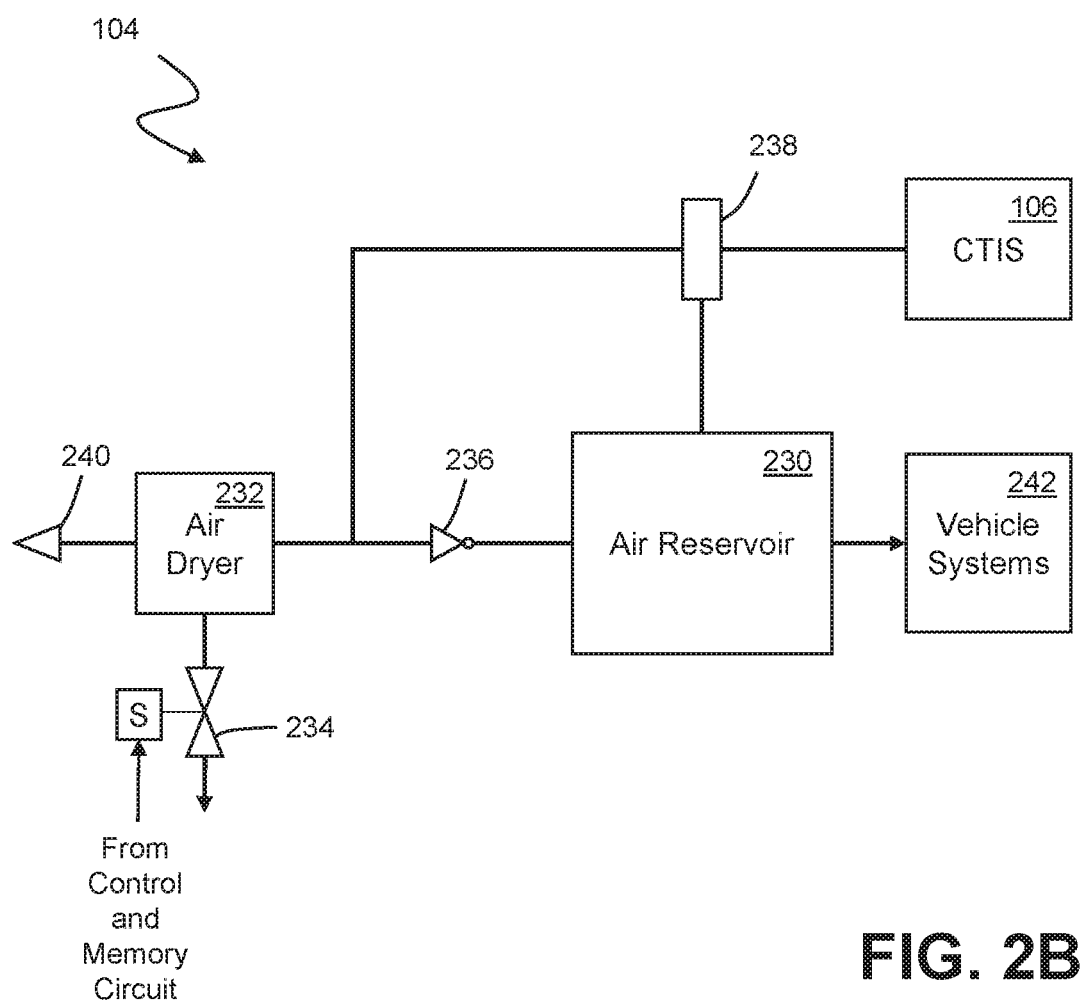
FIG. 2B is a block diagram illustrating an example vehicle air system that connects to a vehicle power pack to receive compressed air.

FIG. 2A is a block diagram illustrating an example implementation of the power pack 102, and FIG. 2B is a block diagram illustrating an example implementation of the vehicle air systems 104. The power pack 102 includes an engine 200, an air compressor 202, an accumulator 204, an unloader valve 206, an air filter 208, a temperature sensor 210, a pressure sensor 212, and a control and memory circuit 214. The engine system 200 includes an engine turbo compressor 216 that receives filtered air 218 from an engine air filter 220. The engine turbo compressor 216 can provide compressed air for the engine 200, which can be an internal combustion engine, for example. The power pack 102 can be used in a vehicle, such as a truck, and can be removable. The power pack 102 can connect electrically and/or pneumatically to other vehicle systems through one or more connectors 222. The unloader valve 206, which is external to the air compressor 202, can be controlled electrically through a solenoid 224, for example. While illustrated and described as a power pack with connectors that allow for quick disconnect, the components of FIGS. 2A and 2B can be integrated as a single system, typical of more classical air compression systems.

The vehicle air systems 104 include an air reservoir 230, an air dryer 232, a purge valve 234, a check valve 236, and a valve 238. The vehicle air systems 104 are connectable to the power pack 102 through one or more connectors 240. While illustrated as a single connection through connectors 222 and 240, additional pneumatic and/or electric connectors can exist between the power pack 102 and the vehicle air systems 104. The air reservoir 230 is positioned and configured to hold compressed air for vehicle systems 242. The vehicle systems 242 are any systems that utilize compressed air including air brakes, suspension systems, windshield wiper systems, or any other air-powered systems.

The engine turbo compressor 216 can be part of a turbocharger, for example. The turbocharger can include a turbine driven by exhaust from the engine 200, for example. The engine air filter 220 can filter ambient air to provide the filtered air 218 to the engine turbo compressor 216. The turbine of the turbocharger can drive the engine turbo compressor 216 to compress the filtered air 218 for use by the engine 200. Some amount of the filtered air 218 can be diverted to the air compressor 202.

The air compressor 202 receives the filtered air 218 at a compressor inlet, compresses the air, and outputs compressed air at a compressor outlet. The compressed air is received by the accumulator 204. The air compressor 202 can be driven by the engine 200, for example. The air compressor 202 can be a rotary compressor, a reciprocating compressor, or any other type of air compressor. The accumulator 204 can be positioned, for example, to provide pulsation absorption for the compressed air provided by the air compressor 202 to damp fluctuations for the pressure sensor 212. In some examples, the power pack 102 does not include an accumulator 204.

The temperature sensor 210 can be positioned to sense a temperature of one or more components of the air compressor 202, such as a temperature of a cylinder of the air compressor 202. In other examples, the temperature sensor can be positioned to sense an air temperature, such as downstream of the outlet of the air compressor 202. In other examples, the temperature sensor 210 can be positioned to sense any temperature at or near the outlet of the air compressor 202. The temperature sensor can be any device capable of providing an analog or digital signal indicative of a temperature at or near an outlet of the air compressor 202 to the control and memory circuit 214.

The pressure sensor 212 can also be positioned downstream of the outlet of the air compressor 202. In an example, the pressure sensor 212 can be positioned to sense the pressure of air within the accumulator 204. In another example, the pressure sensor 212 can be positioned to sense the pressure within the air reservoir 230. The pressure sensor 212 can be any device capable of providing an analog or digital signal indicative of an air pressure downstream of the compressor 202, for example, to the control and memory circuit 214.

The control and memory circuit 214 can include, for example, software, hardware, and combinations of hardware and software configured to execute several functions related to control of power pack 102. In one example, the control and memory circuit 214 can be an engine control module (ECM). The control and memory circuit 214 can include an analog, digital, or combination analog and digital controller including a number of components. As examples, the control and memory circuit 214 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry.

The control and memory circuit 214 may include storage media to store and/or retrieve data or other information such as, for example, signals from the temperature sensor 210 and the pressure sensor 212. Storage devices, in some examples, are described as a computer-readable storage medium. The data storage devices can be used to store program instructions for execution by processor(s) of control and memory circuit 214, for example. The storage devices, for example, are used by software, applications, algorithms, as examples, running on and/or executed by control and memory circuit 214. The storage devices can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random access memories (DRAM), static random access memories (SRAM), and other forms of volatile memories known in the art.

The control and memory circuit 214 provides outputs to control the unloader valve 206 and the purge valve 234. For example, the unloader valve 206 and the purge valve 234 can be closed while the air compressor 202 is providing compressed air for the vehicle air systems 104. The control and memory circuit 214 can monitor the sensed pressure and temperature to determine an overheat condition, or to detect cut-in and cut-out pressures. Upon detection of a condition for which it is desirable to unload the compressor 202, the control and memory circuit 214 can output control signals to open the unloader valve 206 and/or the purge valve 234. The control and memory circuit 214 can control the unloader valve 206 and/or purge valve 234 through solenoids, as illustrated, or through any other means of electrically controlling the valves.

The compressed air within the accumulator 204 is provided to the vehicle air systems 104 through the connectors 222 and 240 to charge the air reservoir 230 for use by the vehicle systems 242. The compressed air can also be used for the CTIS 106. The CTIS 106 can include a solenoid valve, for example, controlled by a CTIS controller to provide air to the CTIS system based on tire inflation settings.

The compressed air is received and dried by the air dryer 232. The air dryer 232 is any device capable of removing water vapor from the compressed air, such as a desiccant dryer, for example. The dried air is used for charging the air reservoir 230 and for the CTIS 106. If the air reservoir 230 is not adequately charged, the dried air is used to charge the air reservoir 230. If the air reservoir 230 is adequately charged, the dried air can be used for the CTIS 106.

The valve 238 is configured, under certain conditions, to permit the air compressor 202 to directly provide compressed air to the CTIS 106. In some generally known systems, high pressure air is bled from the air reservoir 230 for use by the CTIS 106. For example, the air in the air reservoir 230 can be at 145 psi, which is then bled to the CTIS 106. The CTIS 106, however, may only utilize between 20-80 psi, resulting in an inefficient system, increasing the load on the compressor.

The valve 238 can be biased such that when the pressure in the air reservoir 230 reaches a desired value, such as 145 psi, for example, the valve 238 permits flow from the air dryer 232 directly to the CTIS 106, allowing the air compressor 202 to operate just above the present tire pressure. If the pressure in the air reservoir 230 is below the desired value, the flow from the air dryer 232 to the CTIS 106 will be blocked, only allowing flow from the air dryer 232 through the check valve 236 to charge the air reservoir 230. This allows the air reservoir 230 to fully charge prior to allowing the CTIS 106 to receive the relatively low pressure air from the air compressor 202. This is advantageous in systems for which the vehicle systems 242 are safety critical systems such as, for example, air brake systems.

Figure 3:
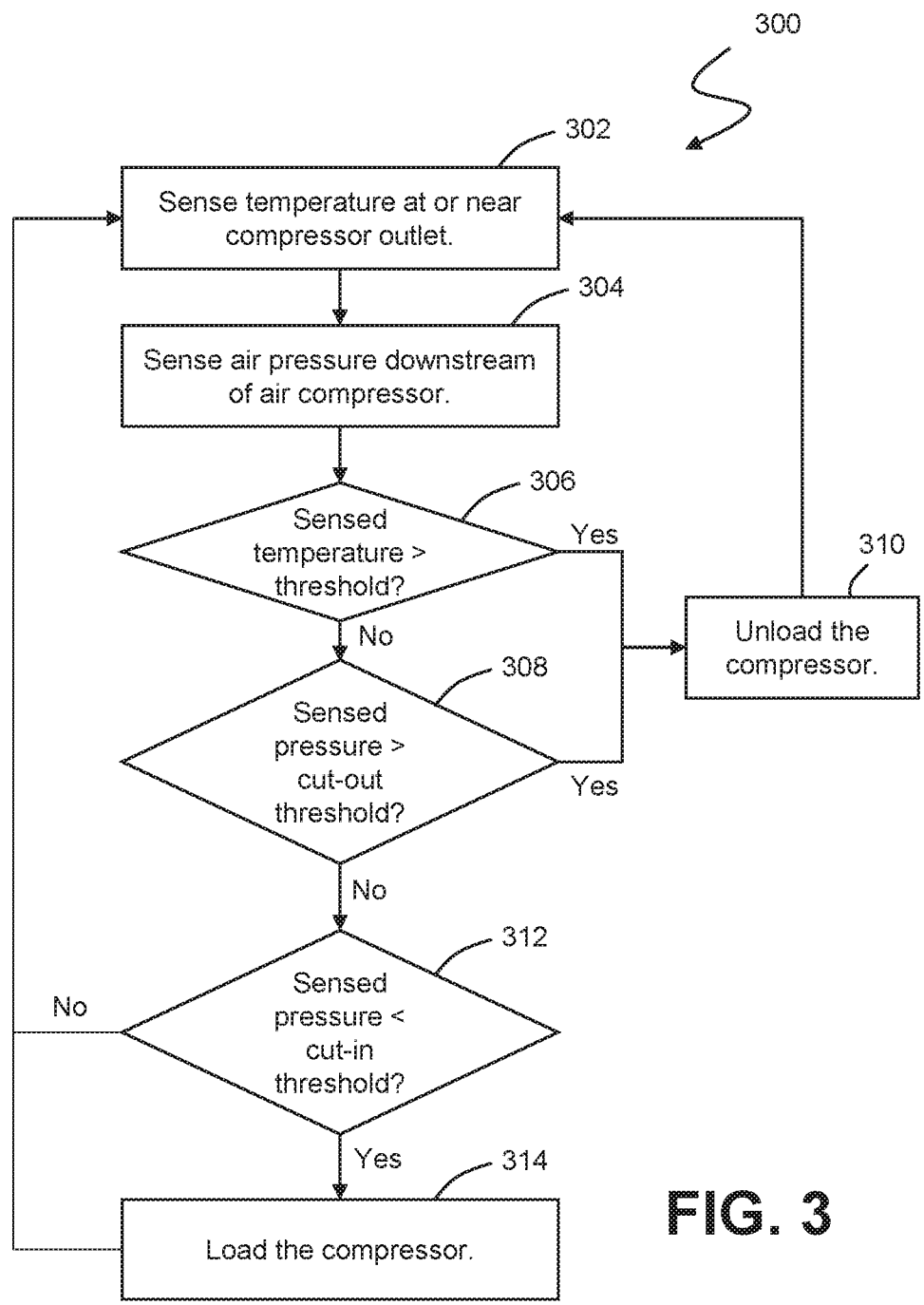
FIG. 3 is a flowchart illustrating a method of controlling a vehicle air compression system.

FIG. 3 is a flowchart illustrating an example method 300 of controlling an air compression system of a vehicle, such as that shown in FIGS. 1-2B. The method 300 can be executed in hardware and/or software by the control and memory circuit 214, for example. At step 302, a temperature at or near the outlet of the air compressor 202 is sensed by the temperature sensor 210 and provided to the control and memory circuit 214. For example, a temperature of a cylinder of the air compressor 202 can be sensed and provided to the control and memory circuit 214. At step 304, an air pressure downstream of the air compressor is sensed by the pressure sensor 212 and provided to the control and memory circuit 214. The air pressure can be sensed within the accumulator 204, the air reservoir 230, or any other location downstream of the air compressor 202. Steps 302 and 304 can occur contemporaneously.

At step 306, the sensed temperature is compared to a threshold temperature. This threshold temperature can be set based on the specific system. The threshold temperature can be a temperature which places the air compressor 202 at risk for overheating such as, for example, 180° C. At step 308, the sensed pressure is compared to a cut-out threshold. The cut-out threshold can be a pressure above which it is desirable to unload the compressor 202. For example, the cut-out pressure can be the maximum rated pressure for the air compressor 202, or any pressure below the maximum rated pressure above which it is desirable to unload the compressor 202.

If either the temperature is greater than the threshold temperature, or the sensed pressure is greater than the cut-out threshold, the method 300 proceeds to step 310 and the control and memory circuit 214 controls the unloader valve 206 to unload the compressor 202. The unloader valve 206, which is external to the air compressor 202, permits flow from the outlet of the air compressor 202 to the engine turbo compressor 216, for example. Because the air is being provided to the engine turbo compressor 216, the filter 208 is positioned to filter the air to ensure that there is no contamination of the air provided to the engine turbo compressor 216. In other examples, the unloader valve 206 can be positioned to permit flow from the outlet of the air compressor 202 to the atmosphere.

If the temperature is below the threshold temperature, and the sensed pressure is less than the cut-out threshold, the method 300 proceeds to step 312 and compares the sensed pressure to a cut-in threshold. The cut-in threshold is a pressure below which it is desirable to load the compressor 202. The cut-in threshold can be a pressure indicative of the air reservoir 230 needing recharging, for example. In one example, the cut-in pressure can be 130 psi, or any other value desirable to load the compressor 202.

If the sensed pressure is less than the cut-in threshold, then the method 300 proceeds to step 314 and the control and memory circuit 214 controls the unloader valve 206 to load the air compressor 202. Arriving at step 314 indicates that the pressure is less than the cut-in pressure, and the temperature is cool enough to permit safe operation of the air compressor 202. The method 300 continues for the duration of operation of the air compression system.

INDUSTRIAL APPLICABILITY

In one illustrative example, the vehicle 100 can be used in a military application and operated in extreme environments. The power pack 102 may be completely enclosed, further increasing temperatures at and around the power pack 102. The vehicle 100 can include an air compressor 202 which can be controlled using a control and memory circuit 214. In an example, control and memory circuit 214 is an engine control module with software configured to provide control for the air compressor 202. Generally available systems use mechanical governors to control cut-in and cut-out pressure. If these thresholds need to be changed, the mechanical governor must be physically altered or replaced to change the cut-in and cut-out pressures. By using the control and memory circuit 214, the cut-in and cut-out pressures can be adjusted easily and without the need to physically change components.

Generally available systems include an unloader system internal to the air compressor that just recirculates air from the high pressure side of the compressor back to the suction side. This prevents additional heat of compression, but because the air simply circulates, no heat is removed, and therefore may not provide sufficient cooling for the compressor. Use of the external unloader valve 206 allows cool ambient air to continuously flow through the unloaded compressor 202, providing more efficient cooling during overheat and other conditions, thereby reducing the amount of unloaded time, as well as the chances of compressor failure.

The above detailed description is intended to be illustrative, and not restrictive. The scope of the disclosure should, therefore, be determined with references to the appended claims, along with the full scope of equivalents to which such claims are entitled.

What is claimed is:

1. An air system comprising:
   an air compressor configured to receive a filtered air;
   a turbo compressor downstream of and operatively connected to an outlet of the air compressor, the turbo compressor configured to provide compressed air for an engine;
   a temperature sensor positioned at or near the outlet of the air compressor and configured to sense a temperature at or near the outlet of the air compressor;
   a valve operatively connected to the outlet of the air compressor, wherein the valve is external to the air compressor and is located on a feedback air loop to the turbo compressor; and
   a controller configured to monitor the sensed temperature at the outlet of the air compressor and control the valve to permit air to flow from the outlet of the air compressor through the valve to the turbo compressor to unload the air compressor if the sensed temperature exceeds a threshold temperature.

2. The air system of claim 1, further comprising:
   a pressure sensor positioned downstream of the air compressor and the temperature sensor and configured to sense a pressure;
   wherein the controller is further configured to monitor the sensed pressure and control the valve to permit air to flow from the outlet of the air compressor through the valve to the turbo compressor upon the pressure exceeding a cutout threshold.

3. The air system of claim 2, further comprising:
   an accumulator positioned downstream of the outlet of the air compressor,
   wherein the sensed pressure is a pressure within the accumulator.

4. The air system of claim 1, further comprising:
   an air reservoir downstream of the compressor, the temperature sensor and the valve as defined by a direction of flow of air through the system, wherein the air reservoir is configured to hold pressurized air from the air compressor; and
   a second valve located upstream of the air reservoir and operatively connected to the outlet of the air compressor, wherein the second valve is configured to permit flow of air to bypass the air reservoir if the pressurized air is above a threshold pressure;
   wherein the controller is configured to monitor the pressure and control the second valve to permit flow of air to bypass the air reservoir if the pressurized air is above the threshold pressure and the controller is configured to monitor the pressure and control the second valve to charge the air reservoir if the pressurized air is less than a cut-in threshold.

5. The air system of claim 4, wherein the second valve is configured to permit the flow of air to a tire inflation system.

6. The air system of claim 4, further comprising:
an air dryer connected between the outlet of the air compressor and the air reservoir; and
a purge valve controllable by the controller to purge air from the air dryer when the sensed temperature exceeds the threshold temperature.

7. The air system of claim 1, wherein the air system is employed on a vehicle, and wherein the vehicle comprises a power pack that comprises the air compressor, the temperature sensor, and the valve, and wherein the power pack includes the engine, and wherein the air compressor is driven by the engine.

8. The air system of claim 7, further comprising an engine air filter and a turbocharger, and wherein the engine air filter is configured to filter ambient air to provide the filtered air, and wherein the valve is positioned and controlled to permit air to flow from the outlet of the air compressor to the turbo compressor.

9. The air system of claim 8, further comprising a second air filter positioned between the valve and the turbo compressor on the feedback air loop.

10. The air system of claim 1, wherein the temperature sensor is positioned to sense a cylinder temperature of the air compressor.

11. A power pack connectable to a vehicle air system, the power pack comprising:
a filtered air supply;
an air compressor;
a temperature sensor positioned to sense a temperature at or near an outlet of the air compressor;
a pressure sensor positioned to sense a pressure downstream of the outlet of the air compressor;
a valve operatively connected to the outlet of the air compressor and positioned external to the air compressor;
an engine turbo compressor downstream of and operatively connected to the outlet of the air compressor, wherein the valve is positioned on a feedback air loop to permit air flow from the outlet of the air compressor to the engine turbo compressor; and
a controller configured to open the valve upon the pressure exceeding a cut-out threshold or the temperature exceeding a temperature threshold to permit air to flow through the valve along the feedback air loop to the engine turbo compressor.

12. The power pack of claim 11, further comprising:
a first air filter configured to filter ambient air to provide the filtered air supply;
and
a second air filter operatively positioned between the valve and the engine turbo compressor.

13. The power pack of claim 11, further comprising an accumulator positioned downstream of the outlet of the air compressor, wherein the pressure sensor is positioned within the accumulator.

14. An air system comprising:
an air compressor configured to receive a filtered air;
a turbo compressor downstream of and operatively connected to an outlet of the air compressor via an engine, the turbo compressor configured to provide compressed air for the engine;
a temperature sensor positioned at or near the outlet of the air compressor and configured to sense a temperature at or near the outlet of the air compressor;
a first valve operatively connected to the outlet of the air compressor, wherein the first valve is external to the air compressor and is located on a feedback air loop to the turbo compressor;
connectors downstream of the compressor, the temperature sensor and the valve as defined by a direction of flow of air through the system, wherein the connectors are configured to allow air from the air compressor to pass therethrough;
an air reservoir downstream of the connectors, wherein the air reservoir is configured to hold pressurized air from the air compressor; and
a second valve located upstream of the air reservoir and operatively connected to the outlet of the air compressor, wherein the second valve is configured to permit flow of air to bypass the air reservoir if the pressurized air is above a threshold pressure;
a controller configured to monitor the sensed temperature at the outlet of the air compressor and control the first valve to permit air to flow from the outlet of the air compressor through the first valve to the turbo compressor to unload the air compressor if the sensed temperature exceeds a threshold temperature, wherein the controller is configured to monitor the pressure and control the second valve to permit flow of air to bypass the air reservoir if the pressurized air is above the threshold pressure and the controller is configured to monitor the pressure and control the second valve to charge the air reservoir if the pressurized air is less than a cut-in threshold.

15. The air system of claim 14, wherein the second valve is configured to permit the flow of air to a tire inflation system.

16. The air system of claim 14, further comprising:
an air dryer connected between the outlet of the air compressor and the air reservoir; and
a purge valve controllable by the controller to purge air from the air dryer when the sensed temperature exceeds the threshold temperature.

* * * * *